United States Patent [19]

Ohashi et al.

[11] Patent Number: 5,041,185
[45] Date of Patent: Aug. 20, 1991

[54] TAPING APPARATUS AND SYSTEM

[75] Inventors: Sakuhei Ohashi; Hiroaki Tashiro, both of Amagasaki, Japan

[73] Assignee: Mitsubishi Denki Kabushiki Kaisha, Tokyo, Japan

[21] Appl. No.: 561,829

[22] Filed: Aug. 2, 1990

[30] Foreign Application Priority Data

Nov. 28, 1989 [JP] Japan .................................. 1-310381

[51] Int. Cl.$^5$ .......................... B31C 13/00; B31F 7/00; B65H 81/00; H01B 19/00
[52] U.S. Cl. .................................... 156/468; 156/192; 156/425; 242/4 B; 242/6; 242/7.09
[58] Field of Search ............... 156/185, 187, 188, 195, 156/425, 431, 432, 446, 468, 392; 242/4 R, 4 B, 6, 7.07, 7.09, 7.11, 7.19, 7.21, 7.23, 173; 493/299, 300, 301; 57/3, 7

[56] References Cited

U.S. PATENT DOCUMENTS

| | | | |
|---|---|---|---|
| 2,512,900 | 6/1950 | Kwitek | 242/56.6 |
| 3,000,167 | 9/1961 | Pierce, Jr. | 57/3 |
| 3,077,068 | 2/1963 | Miller | 156/195 |
| 3,657,041 | 4/1972 | Reynolds, Jr. | 156/195 |
| 3,864,191 | 2/1975 | Tavarys | 156/468 |
| 3,878,602 | 4/1975 | Schubert et al. | 242/7.11 |
| 4,488,685 | 12/1984 | Iida | 242/4 BE |
| 4,707,214 | 11/1987 | Nithart et al. | 156/195 |
| 4,759,810 | 7/1988 | Jackson et al. | 156/64 |

OTHER PUBLICATIONS

Isotap 050 R; catalogue of Derfi, France published in 1982.
Isotap 200 MP; catalogue of Derfi, France, published in 1982.

*Primary Examiner*—Richard Bueker
*Assistant Examiner*—Jeffrey G. Payne
*Attorney, Agent, or Firm*—Oblon, Spivak, McClelland, Maier & Neustadt

[57] ABSTRACT

An automatic taping apparatus for taping a conductive member such as a coil wire of a motor has an automatic adhesive supplying mechanism consisting of an adhesive tank, a tube, a gun and a cylinder for controlling the position of the gun for supplying the adhesive on the coil wire; and further, a tape cutting and clamping mechanism provided on a taping head for clamping a starting end and a finishing end of the tape to adhere them on the coil wire and cut the tape.

4 Claims, 17 Drawing Sheets

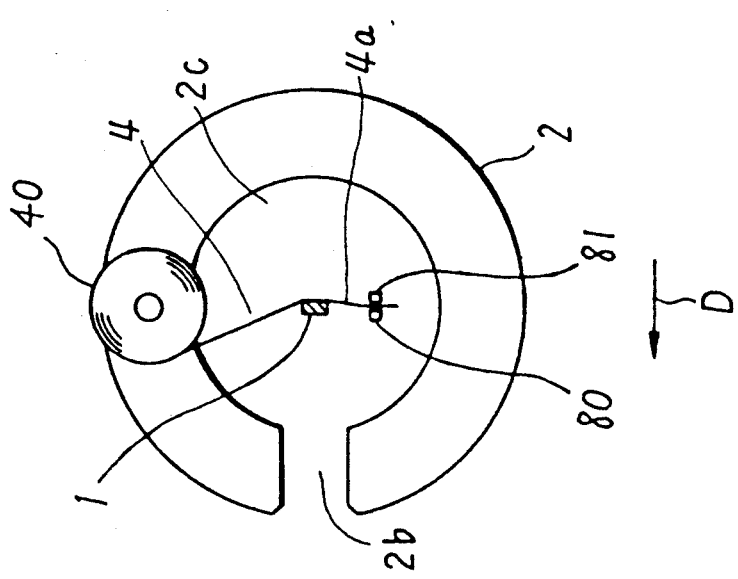
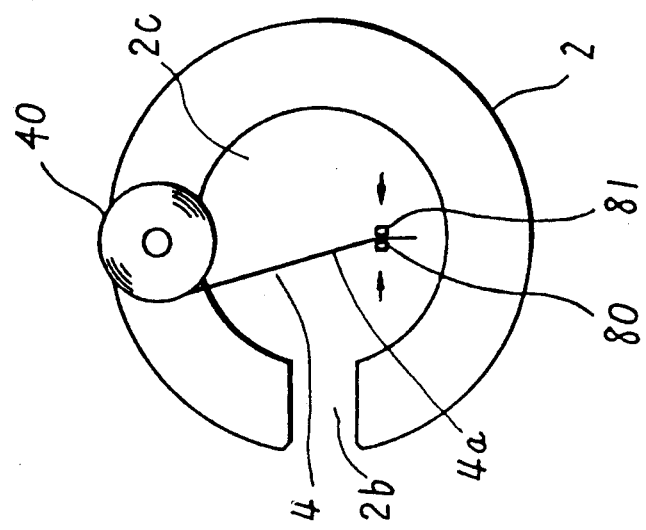
FIG.7 (a) FIG.7 (b) FIG.7 (c)

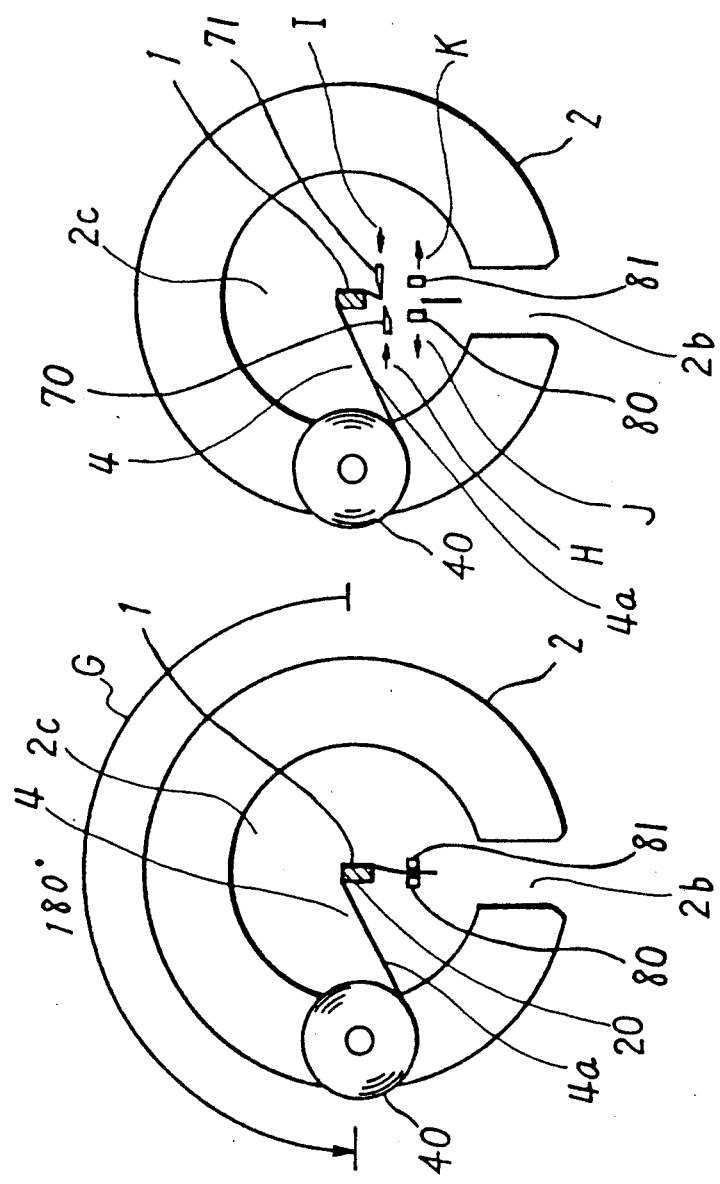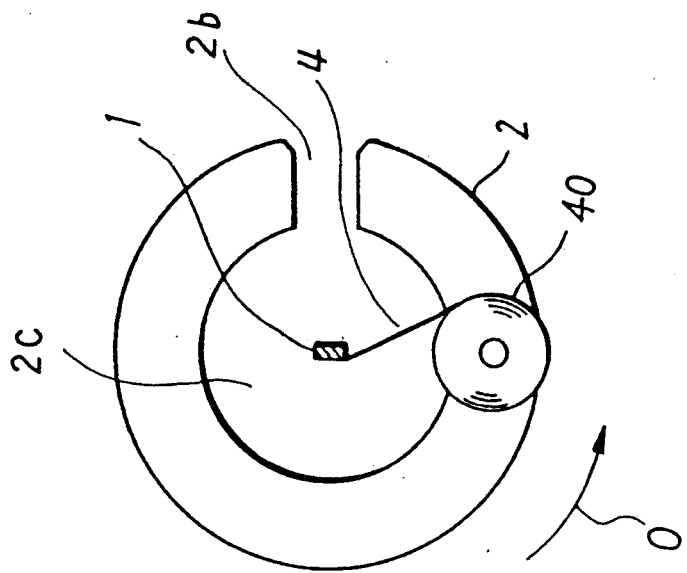

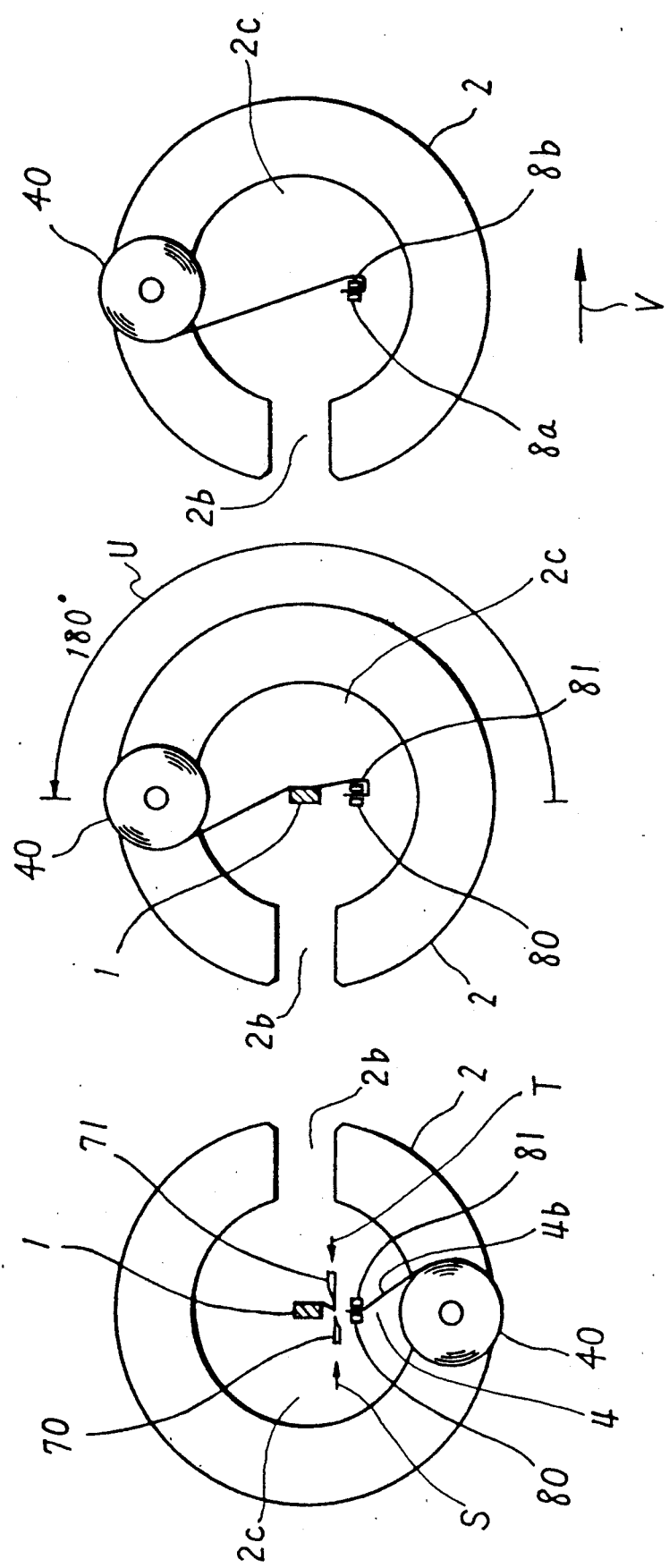

TAPING APPARATUS AND SYSTEM

BACKGROUND OF THE INVENTION

1. Field of the Invention

The present invention relates to a taping apparatus and system for taping wires to be used as, for example, coils of a motor.

2. Description of the Prior Art

FIG. 15 is a perspective view showing an assembled hexagonal-shaped coil 100 consisting of plural coil wires 1, 1, ..., for example, shown in a text book titled KAITEN DENKI KUMITATEKA (How to assemble rotary electric machine), page 272 published by SHOKUGYO KUNREN KYOZAI KENKYUKAI. In FIG. 15, coil wires 1, 1, ... are each constituted by lead-out parts 1a, oblique parts 1b, straight parts 1c and twisted part 1d.

FIG. 16 shows XVI—XVI section of the hexagonal coil 100 shown in FIG. 15. In FIG. 16, the end parts 1b, 1b, ... of the coil wire 1, 1, ... of the hexagonal coil 100 are formed in arc shape of radius R.

Conventional method for taping outer periphery of the coil wires 1, 1, ... of the hexagonal coil 100 shown in FIG. 15 is described. FIG. 19 is a perspective view showing taping of the coil wire 1 by a conventional taping head 110 which is, for example, shown in a catalogue of DERFI, France in 1982. In FIG. 19, a C-letter shaped rotary inner frame 31 is rotatably supported by a C-letter shaped outer frame 32. The coil wire 1 is positioned at the center of a hole part 31c of the rotary inner frame 31. A reel 40 of a tape 4 is rotatably mounted on a side face 31a of the rotary inner frame 31 and the reel 40 of the tape 4 revolves around the coil wire 1 responding to the rotation of the rotary inner frame 31. A driving pulley 33a is rotated by a motor 33b and transmits the rotation force to the rotary inner frame 31 via a belt 34 and guiding pulleys 33c and 33c. The belt 34 contacts outer periphery of the rotary inner frame 31 (not shown in the figure because of obviousness) and thereby the rotary inner frame 31 is rotated. The rotary inner frame 31 and the outer frame 32 have cutting parts 31b and 32a, respectively. When the cutting part 31b of the rotary inner frame 31 faces to the cutting part 32a of the outer frame 32, the coil wire 1 is put into and put out of the center of the hole part 31c of the rotary inner frame 31.

Most simple conventional method for taping the coil wire 1 is described. First, the coil wire 1 is put into the center of the hole part 31c of the rotary inner frame 31. The coil wire 1 is held at both ends thereof by human hands during the taping operation. At the starting of the taping operation, the starting end of the tape 4 is manually fixed on the coil wire 1 by an adhesive tape so as not be loosen by tension of the tape 4 during the taping operation. At the ending of the taping operation, the end of the tape 4 is similarly fixed on the coil wire 1 by the adhesive tape. Then, the ends of the wound tape 4 is cut manually by scissors or a knife.

A conventional taping apparatus having the taping head 110 shown in FIG. 19 is described in detail referring to FIG. 20.

In FIG. 20, the lead part 1a and the twisted part 1d serving as both ends of the coil wire 1 shown in FIG. 15 are held by clamps 26 and 26. First, the lead part 1a and the twisted part 1d of the coil wire 1 are respectively put on base members 26a and 26a and clamped between the base members 26a and 26a and movable members 26b and 26b by operation of clamp screw levers 26c and 26c. Corresponding to the variation of the sizes of the coil wire 1, positions of arms 27 and 27 on a spline shaft 28a are adjusted and fixed on the spline shaft 28a by screws 28b. A holder 29 folds the spline shaft 28a with the arms 27 and 27 and is fixed on a table 30.

The taping head 110, which is constituted by the rotary inner frame 31, the outer frame 32, the driving pulley 33a, the motor 33b, the guiding pulleys 33c and 33c and the belt 34, is held by a holder 35. The holder 35 holding the taping head 110 is held on a vertical sliding unit 23a via a holding frame 22a. The vertical sliding unit 23a is held on a back-and-forth sliding unit 24a via a frame 23d. Furthermore, the back-and-forth sliding unit 24a is held on a right-and-left sliding unit 25a. The right-and-left sliding unit 25a is fixed on the table 30 similar to the holder 29. Hereupon, the sliding units 23a, 24a and 25a are driven up and down, back and forth and right and left by motors 23c, 24c and 25c and feed screws 23b, 24b and 25b, respectively.

Operation of the above-mentioned conventional taping apparatus is described. After adjusting the positions of the arms 27 and 27 on the spline shaft 28a responding to the length of the coil wire 1 to be taped, the lead part 1a and the twisted part 1d of the coil wire 1 are put on the fixed members 26a of the clamp 26 and clamped between the fixed members 26a and 26a and the movable members 26b and 26b by operations of the clamp screw levers 26c and 26c, respectively. Next, the reel 40 of the tape 4 is set on a shaft on the rotary inner frame 31.

After facing the cutting part 31b of the rotary inner frame 31 to the cutting part 32a of the outer frame 32, the vertical sliding unit 23a and the back-and-forth sliding unit 24a are driven in a manner to position the coil wire 1 at the center of the hole part 31c of the rotary inner frame 31.

The starting end part and the finishing end part of the tape 4 are generally at positions on the oblique parts 1b and 1b in the vicinity of the twisted part 1d and the lead part 1a of the coil wire 1.

FIG. 20 shows the taping operation on the straight part 1c of the coil wire 1 shown in FIG. 15. The starting end part 4a of the tape 4 is fixed manually on the coil wire 1 by the adhesive tape at the starting of the taping operation. And also, the finishing end part of the tape 4 is fixed on the coil wire 1 by the adhesive tape similar to the starting end part 4a of the tape 4 so as not be loosen. And the wound part of the tape 4 is cut from the remainder by the scissors when the taping operation is over.

When a start signal of the taping operation is given, the motor 33b starts to rotate. The rotation force of the motor 33b is transmitted to the driving pulley 33a. Furthermore, the rotation force is transmitted to the rotary inner frame 31 via the belt 34 and the guiding pulleys 33c and 33c. When the rotary inner frame 31 rotates, the reel 40 of the tape 4 on the rotary inner frame 31 also revolves around the coil wire 1. Thereby, the tape 4 is wound on the coil wire 1. The rotary inner frame 31 is moved vertically up-and-down by the motion of the vertical sliding unit 23a, horizontally back and forth by the motion of the back-and-forth sliding unit 24a and horizontally right and left by the right-and-left sliding unit 25a and swung on account of rotation of the holder 35 by rotation of a motor 22b, which are controlled by data of the sizes of the coil wire 1 previously inputted in a control apparatus (not shown in the figure). Thereby, the coil wire 1 is always positioned and taped at the center of the hole part 31c of the rotary inner frame 31. When the taping operation on a side of the coil wire 1 is completed, the coil wire 1 is put out from the clamps 26 and 26. After that, the coil wire 1 is turned and clamped by the clamps 26 and 26 again. The taping operation on the other side of the coil wire 1 is executed similar to the above-mentioned operations.

As mentioned above, in the conventional taping apparatus, only the taping operation is automated, but the fixing or bonding of the starting end and finishing end of the tape 4 on the coil wire 1 by the adhesive tape and cutting of the tape 4 (hereinafter abbreviated as starting and finishing treatment of the tape on taping operation) must be executed manually. Therefore, there is a problem that whole of the taping operation of the coil wire 1 can not be automated.

OBJECT AND SUMMARY OF THE INVENTION

Purpose of the present invention is to provide an improved taping apparatus to be automated from starting to finishing of the taping of a conductive member such as coil wire.

A taping apparatus in accordance with the present invention comprises:

a frame;

rotation member which has a circular hole for disposing an objective conductive member of a winding around the center of the circular hole and is held rotatably in the frame;

driving means mounted on the frame and for rotatingly driving the rotation member;

tape holding means provided on the rotation member for holding a reel of a tape with its axis parallel to the axis of rotation of the rotation member and with a predetermined distance from the axis of rotation;

moving means for relatively moving the rotation member or the conductive member;

tape clamp means provided on the rotation member for clamping a starting end and a finishing end of the tape at the start and at the finish of winding;

adhesion means provided on the frame and for supplying an adhesive on the conductive member for adhering the ends of the tape on the conductive member; and cutting means provided on the frame and for cutting the end of the tape.

As mentioned above, the taping apparatus in accordance with the present invention comprises the tape clamp means, such as clamp members, for clamping the tape at the starting end and the finishing end of the taping operation, the cutting means, such as cutting blades, for cutting the end of the tape wound on the conductive member from the remainder coming from a tape supply reel and the adhesion means, such as adhesive supplying nozzle, for supplying the adhesive for fixing the starting end and finishing end of the tape on the conductive member such as a coil wire. Therefore, the whole of the taping operation can be automated by the taping apparatus.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 7 (a), 7 (b), 7 (c), 8 (a), 8 (b), 8 (c), 9 (a), 9 (b), 9 (c), 10 (a), 10 (b) and 10 (c) are respectively schematic front views showing taping processes of the taping apparatus in accordance with the present invention.

It will be recognized that some or all of the Figures are schematic representations for purposes of illustration and do not necessarily depict the actual relative sizes or locations of the elements shown.

DESCRIPTION OF PREFERRED EMBODIMENTS

A preferred embodiment of a taping apparatus in accordance with the present invention is described referring to FIGS. 1, 2, 3, 4, 5, 6, 7 (a), 7 (b), 7 (c), 8 (a), 8 (b), 8 (c), 9 (a), 9 (b), 9 (c), 10 (a), 10 (b), 10 (c), and 11.

Figure 1:
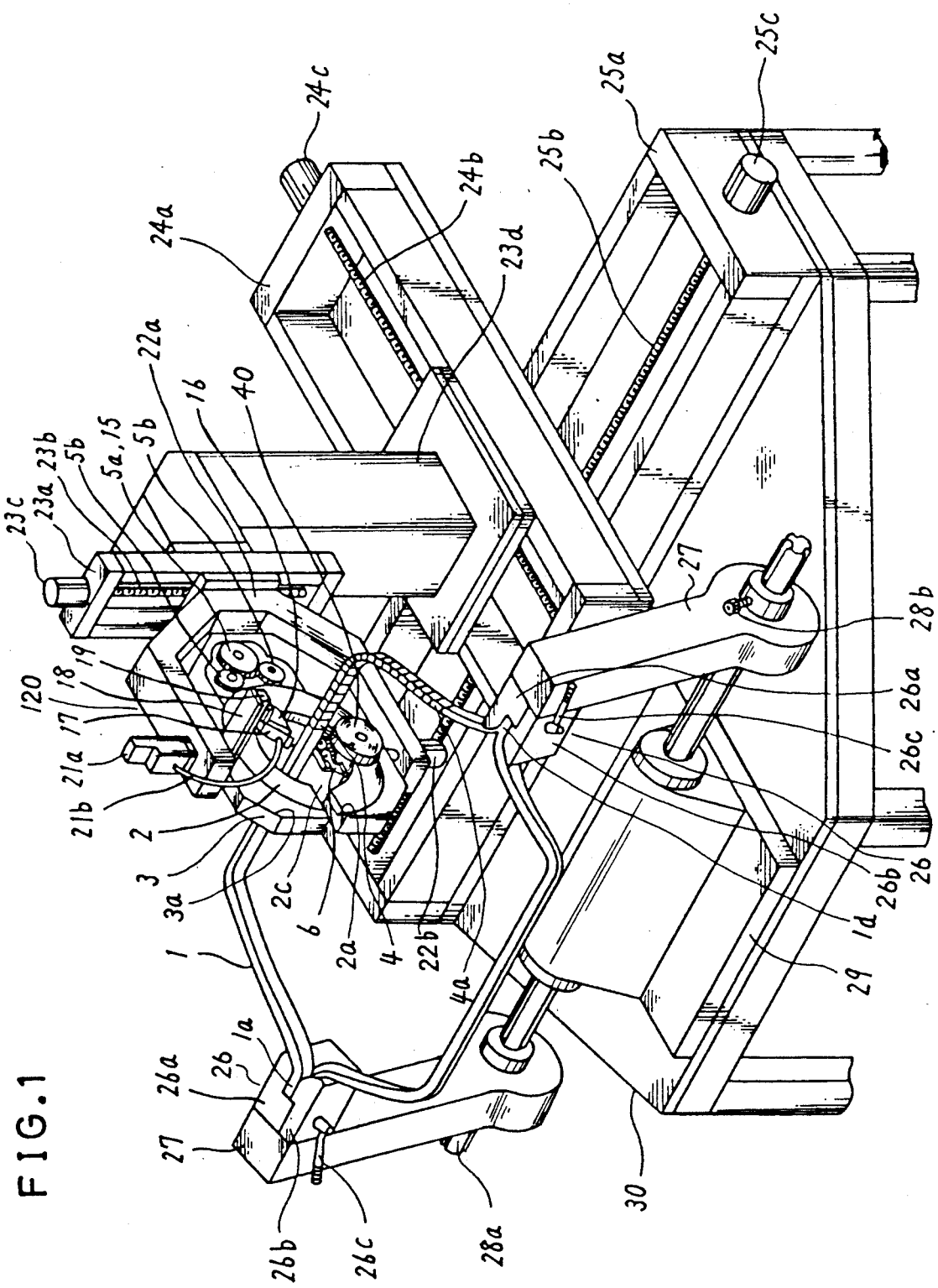
FIG. 1 is a perspective view showing a preferred embodiment of a taping apparatus in accordance with the present invention.
Figure 15:
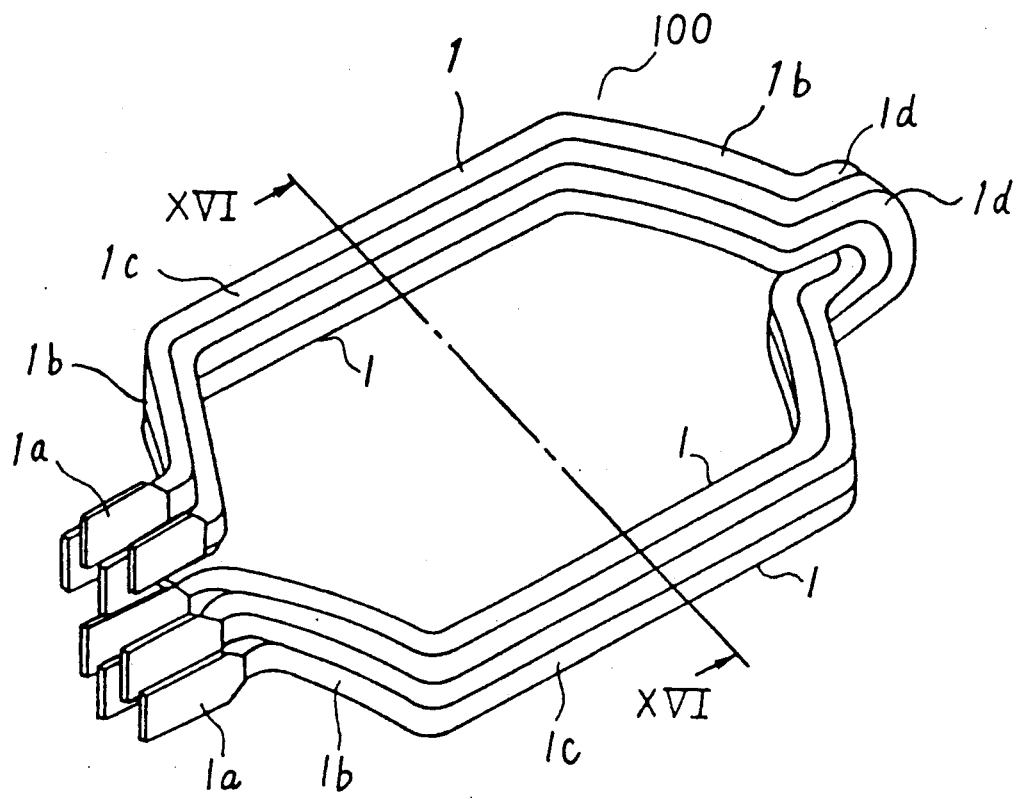
FIG. 15 is the perspective view showing the conventional hexagonal coil.

In FIG. 1, both ends of a coil wire 1, for example, a lead part 1a and a twisted part 1d, which are substantially the same as those shown in FIG. 15, are clamped between fixed members 26a and 26a and movable members 26 and 26b by operation of clamp screw levers 26c and 26c. Corresponding to the variation of the sizes of the coil wire 1, positions of arms 27 and 27 on a spline shaft 28a are adjusted and fixed by screws 28b. A holder 29 holds the horizontal spline shaft 28a. The arms 27 and 27 are fixed vertical to the shaft 28a, and the holder 29 is fixed on a table 30.

Figure 2:
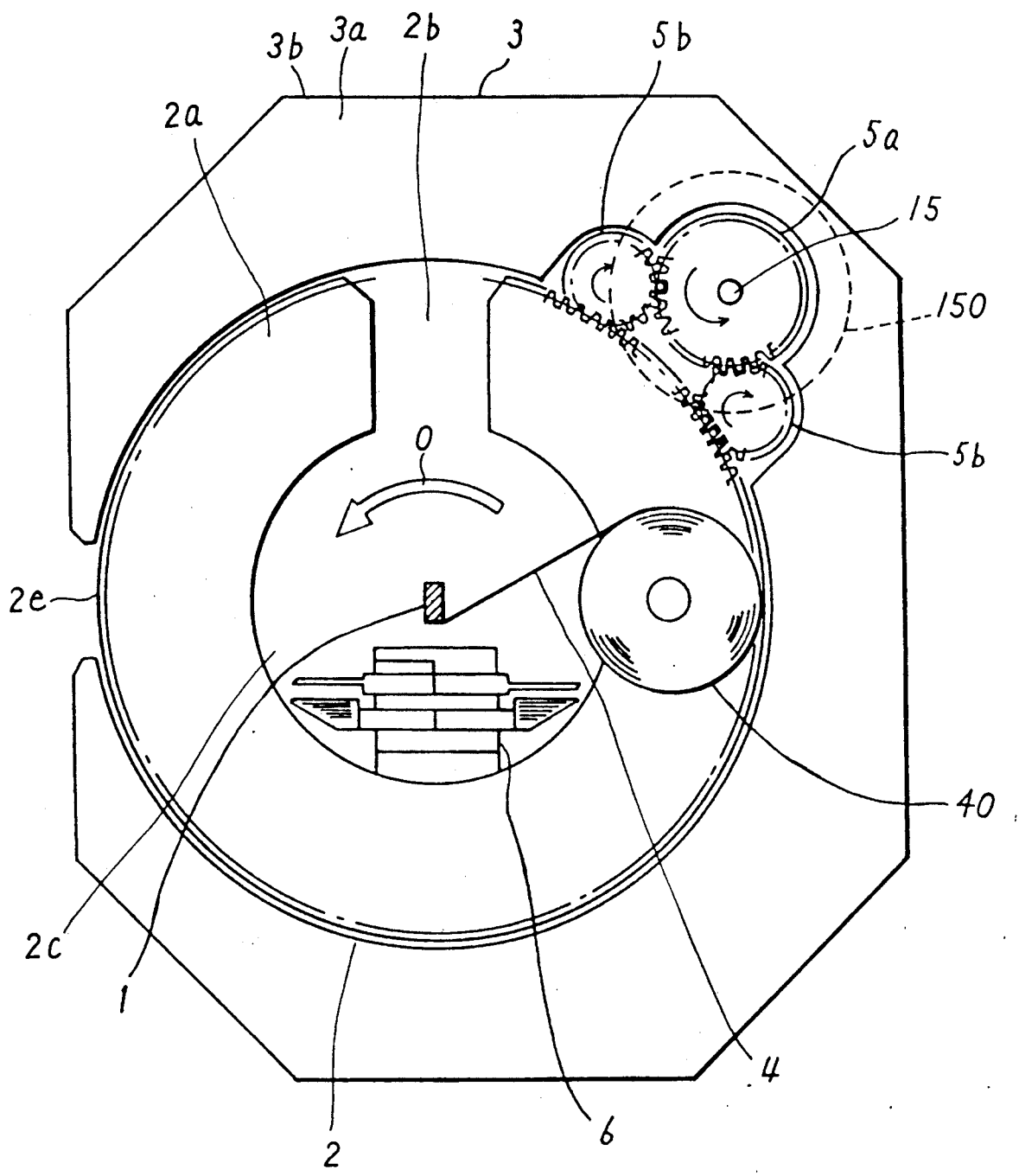
FIG. 2 is a front view showing details of a taping head part of the taping apparatus in accordance with the present invention.

A rotation member 2 is rotatably fit in an inner periphery of a frame 3. The whole parts of outer periphery 2e of the rotation member 2 is gear-cut and coupled with a driving gear 5a via intermediate gears 5b and 5b as shown in FIG. 2. The driving gear 5a is directly coupled with a shaft 15 of a motor 150 which is fixed on a back face of the frame 3. A reel 40 of a tape 4 is rotatably held on a side face 2a of the rotation member 2. A horizontal holder 18 is fixed on a side face 3a of the frame 3 and parallel to a rotation axis of the rotation member 2. The horizontal holder 18 holds a cylinder 19 parallel to the axis of the rotation member 2. A vertical holder 16 is fixed on the cylinder 19 and holds a gun 17. An adhesive tank 21a is provided on a top face of a holder 22a and connected to the gun 17 via a tube 21b for supplying liquid adhesive to the gun 17. A motor 22b is provided on the bottom of the holder 22a and directly connected to the frame 3 via a shaft. A cutting and clamping mechanism 6 is fixed on the frame 3. The above-mentioned elements constitutes a taping head part 120.

The taping head part 120 is held by a vertical sliding unit 23a via a holder 22a. The vertical sliding unit 23a is held on an back-and-forth sliding unit 24a via a frame 23d. The back-and-forth sliding unit 24a is fixed on a right-and-left sliding unit 25a. The right-and-left sliding unit 25a is fixed on the table 30, which is similar to the holder 29. Hereupon, the sliding units 23a, 24a and 25a has motors 23c, 24c and 25c and feed screws 23b, 24b and 25b and are driven up and down, before and forth and right and left, respectively.

FIGS. 2 to 6 show the details of main parts of the taping apparatus in accordance with the present invention shown in FIG. 1.

FIG. 2 shows a driving mechanism of the rotation member 2. The rotation member 2 has a substantially C-letter shape and the whole outer periphery 2e thereof is gear-cut. The outer periphery 2e of the rotation member 2 is rotatably supported by the frame 3 and geared with the two intermediate gears 5b and 5b. And the intermediate gears 5b and 5b are geared with the driving gear 5a.

The reel 40 of the tape 4 is held on the side face 2a of the rotation member 2. When the driving gear 5a is rotated in, for example, counterclockwise direction, the rotation member 2 is rotated in counterclockwise direction shown by arrow O via the rotation of the intermediate gears 5b and 5b in clockwise direction. Accordingly, the reel 40 of the tape 4 revolves around the coil wire 1 and thereby the tape 4 is wound along the outer periphery of the coil wire 1.

Figure 3:
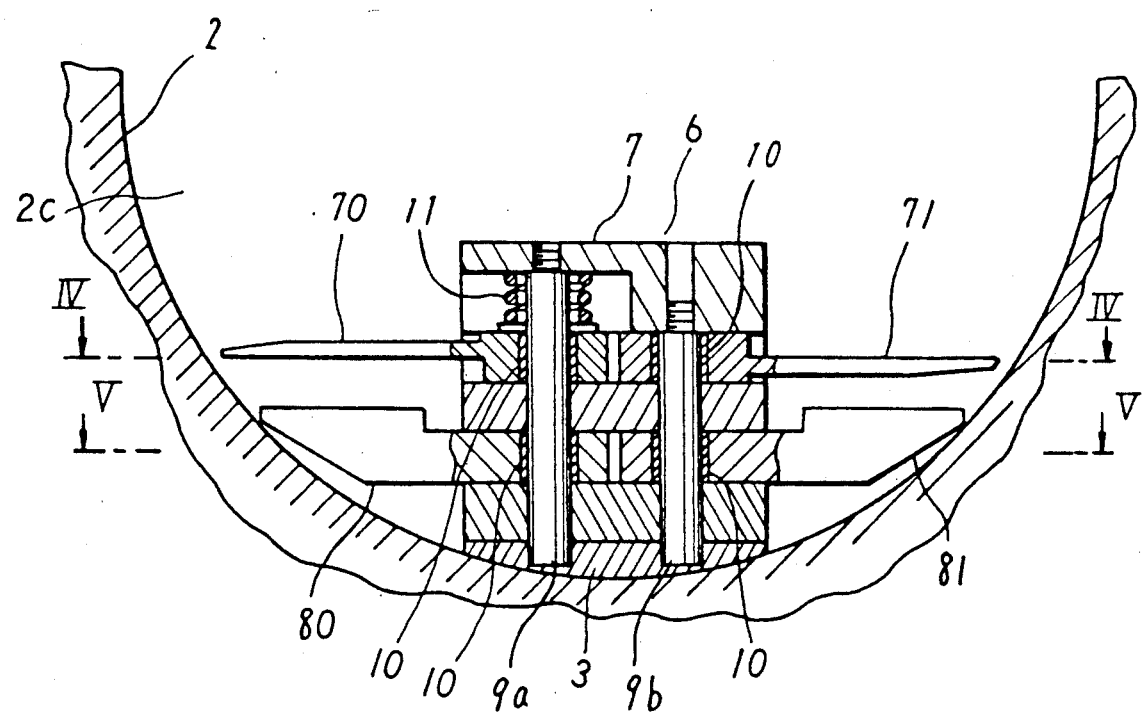
FIG. 3 is a cross-sectional front view showing details of a cutting mechanism and a clamp mechanism of the taping apparatus in accordance with the present invention.
Figure 4:
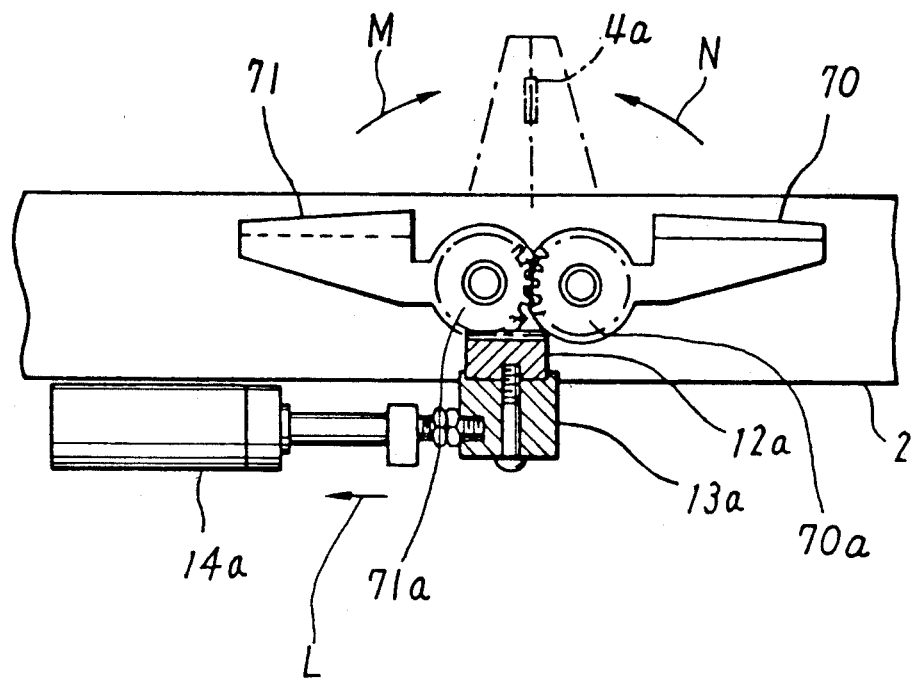
FIG. 4 is IV—IV section view of FIG. 3.
Figure 5:
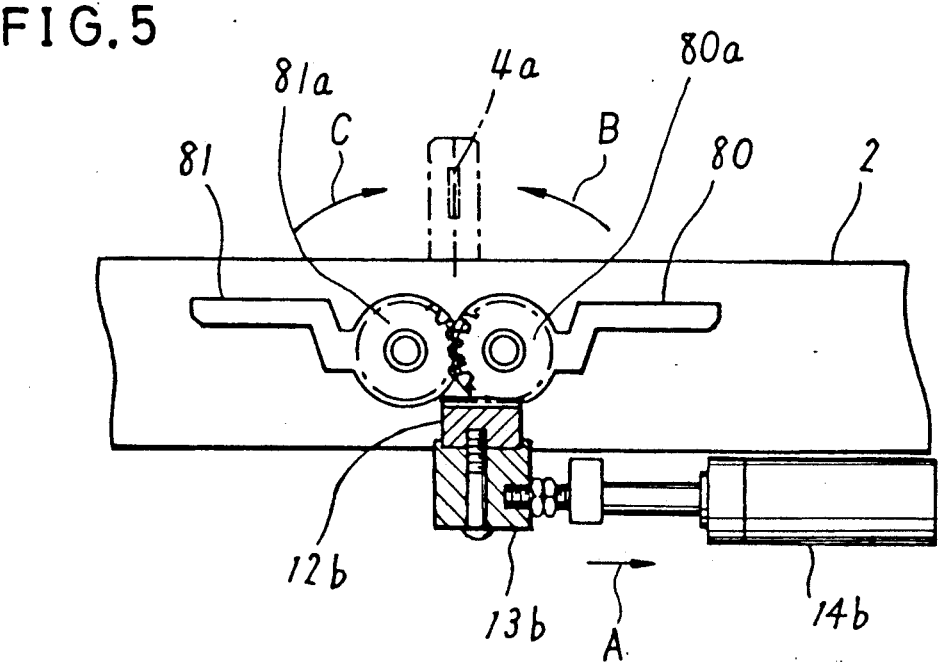
FIG. 5 is V—V section view of FIG. 3.

The cutting and clamping mechanism 6 is described referring to FIGS. 3, 4 and 5. FIG. 3 shows the constitution of the cutting and clamping mechanism 6. FIG. 4 is IV—IV section in FIG. 3 and shows the cutting operation of the cutting and clamping mechanism 6. FIG. 5 is V—V section in FIG. 3 and shows the clamping operation of the cutting and clamping mechanism 6.

In FIG. 3, a mounting base 7 holds elements which constitutes the cutting and clamping mechanism 6 and are fixed to the frame 3 at the inside of hole part 2c of the rotation member 2 in a manner to be able to operate the cutting and clamping mechanism 6. An upper cutting blade 70, a lower cutting blade 71, a left clamp member 80 and a right clamp member 81 are rotatably bore by pins 9a and 9b and bearings 10, 10, . . . on the mounting base 7, respectively. The upper cutting blade 70 is pressed by a spring 11 for tightly contacting the lower cutting blade 71 during the cutting operation.

In FIG. 4, the upper and lower cutting blades 70 and 71 serve as scissors for cutting the tape 4, and respective of the stem parts 70a and 71a are gear-cut and gear-coupled with each other. A rack 12a, which is geared with the lower cutting blade 71, is fixed on a sliding plate 13a and the sliding plate 13a is coupled to a cylinder 14a.

In FIG. 5, the left and right clamp members 80 and 81 serve as a clamp for clamping the end of the tape 4 and respective of the stem parts 80a and 81a are gear-cut and gear-coupled with each other, respectively. A rack 12b, which is geared with the left clamp member 80, is fixed on a sliding plate 13b and the sliding plate 13b is coupled to a cylinder 14b.

Figure 6:
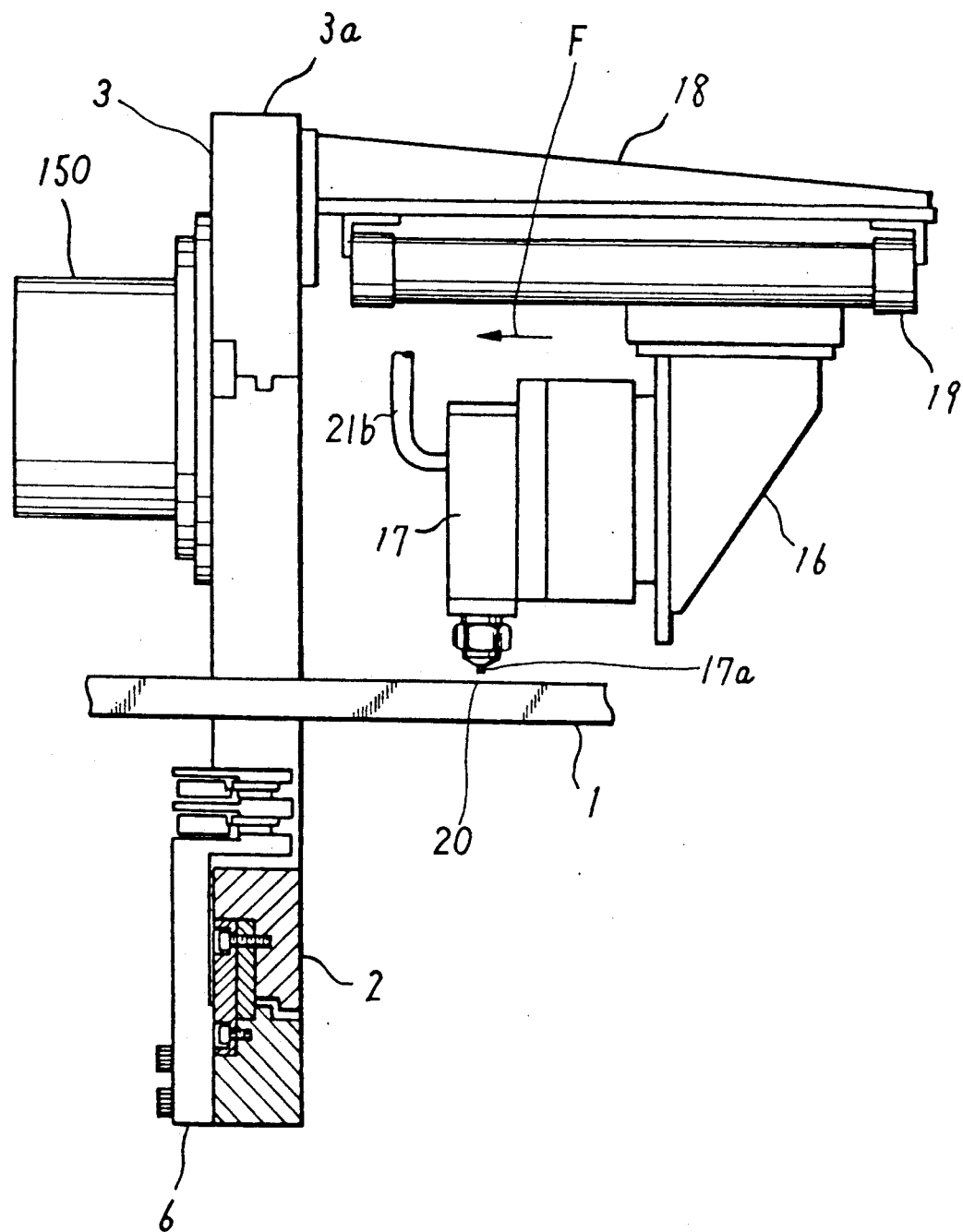
FIG. 6 is a partially sectional front view showing details of an adhesion mechanism of the taping apparatus in accordance with the present invention.

FIG. 6 shows the details of the adhesion mechanism of the taping apparatus in accordance with the present invention. The gun 17 is held on the vertical holder 16, which is fixed on the cylinder 19. Furthermore, the cylinder 19 is horizontally fixed on the horizontal holder 18, which is fixed on the frame 3. Thereby, the gun 17 is horizontally moved by the motion of the cylinder 19. The motor 150 is provided on the frame 3 for rotating the rotation member 2. The driving mechanism of the rotation member is as described before and shown in FIG. 2. Hereupon, the gun 17 is positioned just above the coil wire 1.

The taping operation of the taping apparatus in accordance with the present invention is described. In FIG. 1, the positions of the arms 27 and 27 are adjusted corresponding to the length of the coil wire 1 to be taped. And, the coil wire 1 is clamped by the clamps 26 and 26. After that, the reel 40 of the tape 4 is set on the rotation member 2. Up to this process, the operations are executed by human hand. After this process, the taping operation is automatically executed by the aforementioned taping apparatus in accordance with the present invention based on previously inputted control data in a control apparatus (not shown in the figure).

Automatic taping processes are shown in FIGS. 7 (a), 7 (b), 7 (c), 8 (a), 8 (b), 8 (c), 9 (a), 9 (b), 9 (c), 10 (a), 10 (b) and 10 (c). In FIG. 7 (a), the starting end 4a of the tape 4 set on the rotation member 2 is clamped by the left and right clamp members 80 and 81 in directions shown by arrows. The clamping operation of the left and right clamp members 80 and 81 is described referring to FIG. 5. When the cylinder 14b is moved in a direction shown by arrow A, the rack 12b also moves in the direction shown by arrow A. The left clamp member 80 geared with the rack 12b is rotated in a direction shown by arrow B by the movement of the rack 12b. At the same time, the right clamp member 81 geared with the left clamp member 80 at their stem parts 80a and 81a is rotated in an opposite direction shown by arrow C. When the left and right clamp members 80 and 81 jut out to the outside of the rotation member 2, the starting end 4a of the tape 4 which is hung down from the reel 40 (not shown in FIG. 5) is clamped by close contact of the left and right clamp members 80 and 81. For releasing the clamping of the tape 4 by the left and right clamp members 80 and 81, the cylinder 14b is to be moved in the opposite direction of arrow A.

After the clamping operation is completed, in FIG. 1, the frame 23d is moved by the motion of the back-and-forth sliding unit 24a to a position where the coil wire 1 is at the center of the hole 2c of the rotation member 2. In FIG. 7 (b), arrow D designates the direction of the movement of the frame 23d. In this state, the starting end 4a of the tape 4 and the coil wire 1 contact each other. Next, the rotation member 2 is rotated by an angle 90° in a direction shown by arrow E as shown in FIG. 7 (c). At this time, the cutting part 2b of the rotation member 2 turns to the starting end and the starting end 4a of the tape 4 is parted from the coil wire 1. After that, the adhesive 20 is spread on the coil wire 1 by the gun 17.

The spread of the adhesive 20 is described referring to FIG. 6. The adhesive 20 supplied from the adhesive tank 21a (shown in FIG. 1) via the tube 21b is spread on the coil wire 1 from the nozzle 17a of the gun 17. FIG. 6 shows a spreading operation of the adhesive 20 on the coil wire 1, the gun 17 is moved in a direction shown by arrow F by the motion of the cylinder 19 during the spreading operation. At this time, the cutting part 2b of the rotation member 2 turns to the starting end as shown in FIG. 7 (c), the gun 17 may not spatially interfere the rotation member 2. Accordingly, the adhesive 20 can be spread just on the starting end face of the coil wire 1 in this state. After the spread of the adhesive 20 is completed, the gun 17 returns to the initial position by the motion of the cylinder 19. By return of the gun 17, the rotation member 2 may not spatially interfere the gun 17 even when the rotation member 2 is rotated for reel the tape 4 on the coil wire 1.

Next, the rotation member 2 is rotated by an angle 180° as shown in FIG. 8 (a). By such a rotation, the starting end part 4a of the tape 4 and the adhesive 20 spread on the starting end surface of the coil wire 1 are contacted and thereby the starting end part 4a of the tape 4 is adhered on the coil wire 1. Hereupon, the reel 40 of the tape 4 is held on the rotation member 2 for maintaining a tension properly by the reel 40 of the tape 4, so that the adhesive 20 spread on the coil wire 1 is pressed by the leading part 4a of the tape 4 and the tape 4 is firmly adhered on the coil wire 1. As the adhesion is completed after waiting several seconds in this state, a protrusion part of the tape 4 from the face of the coil wire 1 is cut by the motion of the upper and lower cutting blades 70 and 71 in the direction shown by arrows H and I as shown in FIG. 8 (b). After completion of the cutting of the tape 4, the upper and lower cutting blades 70 and 71 returns to the initial positions, and the left and right clamp members 80 and 81 are also released in the directions shown by arrows J and K at the same time.

Cutting operation is described referring to FIG. 4. When the cylinder 14a is moved in a direction shown by arrow L, the rack 12a also moves in the direction of arrow L. The lower cutting blade 71 geared with the rack 12a is rotated in a direction shown by arrow M by the movement of the rack 12a. At the same time, the upper cutting blade 70 geared with the lower cutting blade 71 at their stem parts 70a and 71a is rotated in an opposite direction shown by arrow N. When the upper and lower cutting blades 70 and 71 jut out to the outside of the rotation member 2, the starting end part 4a of the tape 4 is cut by crossing of the upper and lower cutting blades 70 and 71. For returning the upper and lower cutting blades 70 and 71 to the initial positions, the cylinder 14a is to be moved in the opposite direction of arrow L. The above-mentioned cutting operation is the same theory as the scissors for hand, but the upper cutting blade 70 is always pressed the lower cutting blade 71 for closely contacting each other the by spring 11 as shown in FIG. 3. Thereby, the cut of the tape 4 is made sharp. Furthermore, the upper and lower cutting blades 70 and 71 and the left and right clamp members 80 and 81 are restored to the inside of the hole 2c of the rotation member 2 as shown in FIG. 3, and does not interfere the rotation of the rotation member 2 with the reel 40 of tape 4 as shown in FIGS. 4 and 5. The starting treatment of the taping operation is completed at this process.

Next, the taping operation starts by continuous rotating of the rotation member in a direction shown by arrow O as shown in FIG. 8 (c). In FIG. 2, the rotation of the driving gear 5a, which is directly coupled to the shaft 15 of the motor 150 positioned on the back face of the frame 3, is transmitted to the rotation member 2 via the intermediate gears 5b and 5b. And thereby, the rotation member 2 is rotated in the direction shown arrow O. In this case, as the reel 40 of the tape 4 is held on the side face 2a, the reel 40 of the tape 4 revolves around the coil wire 1. Thereby, the outer periphery of the coil wire 1 is taped.

In FIG. 1, the rotation member 2 is moved vertically up and down by the motion of the vertical sliding unit 23a, horizontally back and forth by the motion of the back-and-forth sliding unit 24a and horizontally right and left by the right-and-left sliding unit 25a and swung by the rotation of the frame 3 by the motor 22b, which are controlled by data of the sizes of the coil wire 1 previously inputted in the control apparatus (not shown in the figure). Thereby, the coil wire 1 is always positioned and taped at the center of the hole part 2c of the rotation member 2. As mentioned above, the taping operation at one side of the coil wire 1 is completed.

Figure 9C:
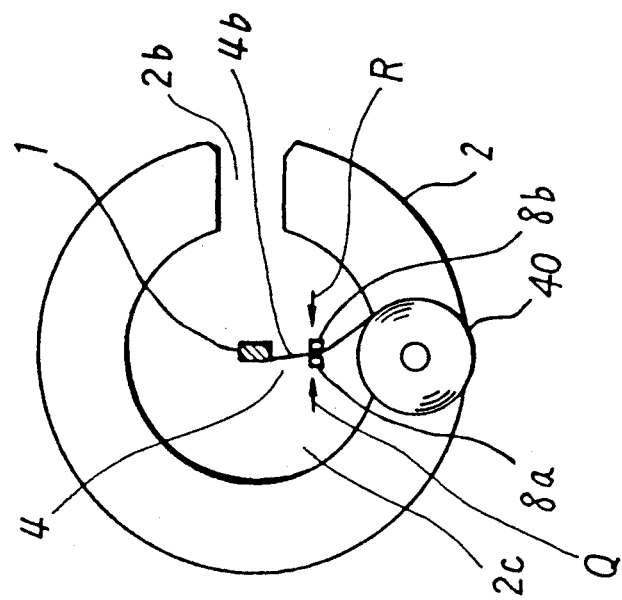
Figure 9B:
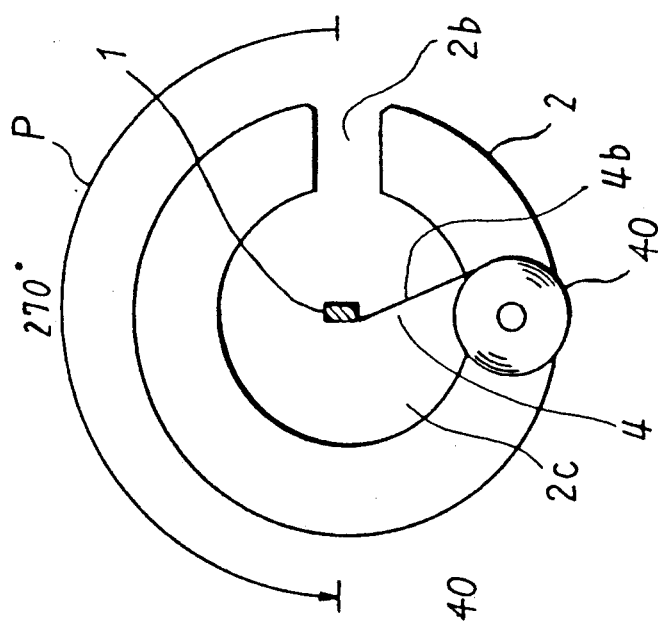
Figure 9A:
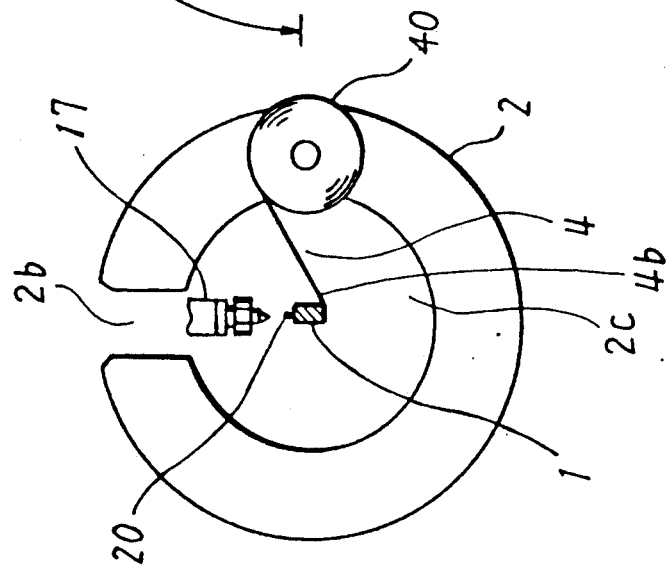

Next, the finishing treatment of the tape 4 is described. After stopping the rotation of the rotation member 2 at a position as shown in FIG. 9(a), the adhesive 20 is spread on the coil wire 1 by the gun 17 similarly to the case shown in FIG. 7(c). After that, when the rotation member 2 is rotated in a direction shown by arrow P to reach through angle 270° as shown in FIG. 9(b), the finishing end 4b of the tape 4 is adhered on the coil wire 1 similarly to the case shown in FIG. 8(a). As the adhesion is completed after waiting several seconds in this state, the finishing end 4b of the tape 4 wound on the coil wire 1 is clamped by the left and right clamp members 80 and 81 in directions shown by arrows Q and R as shown in FIG. 9(c), which is similar to the case shown in FIG. 7(a).

Furthermore, the finishing end 4b of the tape 4 wound on the coil wire 1 is cut by the movement of the upper and lower cutting blades 70 and 71 in directions shown by arrows S and T as shown in FIG. 10(a) which is similar to the case shown in FIG. 8(b). When the cutting operation is completed, the upper and lower cutting blades 70 and 71 are returned to the initial positions. At this time, the clamping of the tape 4 by the left and right clamp mechanism 80 and 81 is maintained. Next, when the rotation member 2 is rotated in a direction shown by arrow U by angle 180° as shown in FIG. 10(b), the cutting part 2b of the rotation member 2 is positioned at the left hand of the figure and the reel 40 of the tape 4 is positioned at the starting end. The finishing treatment of the taping operation is completed at this process.

When the finishing end treatment of the taping operation is completed, the rotation member 2 is horizontally moved in a direction shown by arrow V in FIG. 10 (c) which is the opposite direciton shown in FIG. 7(b). The state shown in FIG. 10(c) corresponds to the state shown in FIG. 7(a), and the taping apparatus stands by the next starting treatment of the taping operation. When the taping operation on one side of the coil wire 1 is completed by the above-mentioned processes, the coil wire 1 is put out from the clamps 26 and 26. After turning of the coil wire 1 by 180° around a line connecting the parts of the lead part 1a and the twisted part 1d, and clamping of the coil wire 1 by the clamps 26 and 26 again, another taping of the other side of the coil wire 1 starts. The taping operation on the other side of the coil wire 1 is executed by the same processes as shown and described with reference to FIGS. 7(a) to 10(c). When the taping operation on the other side of the coil wire 1 is also completed, the rotation member 2 is automatically returned to the initial position. After that, the taped coil 100 is manually put out from the clamps 26 and 26. And another new coil to be taped is clamped by the clamps 26 and 26.

Figure 11:
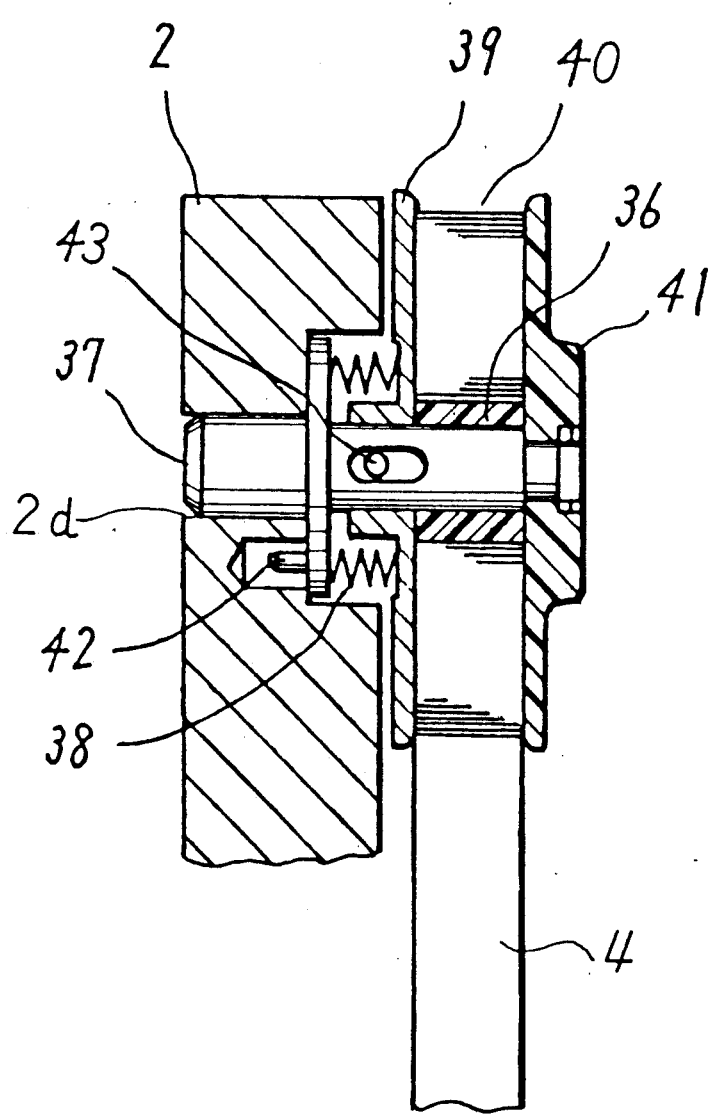
FIG. 11 is a cross-sectional side view showing the detail of a tape holding mechanism of the taping apparatus in accordance with the present invention.

FIG. 11 is a cross sectional view showing the holding mechanism of the reel 40 of the tape 4 on the rotation member 2 and the details of the reel 40 of the tape 4. In FIG. 11, the tape 4 is wound on a core 36. The core 36 is coupled with a shaft 37, which is also fit into a hole 2d provided on the rotation member 2 and fixed by a pin 42 so as not to rotate during the taping operation. A spring 38 is provided between the rotation member 2 and a holder 39 which is coupled with the shaft 37 for holding the tape 4 on the core 36. The holder 39 is fixed on the shaft 37 by a pin 43 so as not to drop out the reel 40 of the tape 4 from the shaft 37. A cap 41 is fixed on the shaft 37 for receiving the elastic force of the spring 38 and preventing the drop out of the reel 40 of the tape 4. Therefore, the tape 4 is given the tension by the spring 38. The reel 40 of the tape 4 is constituted by the above-mentioned elements 36 to 42.

Figure 12:
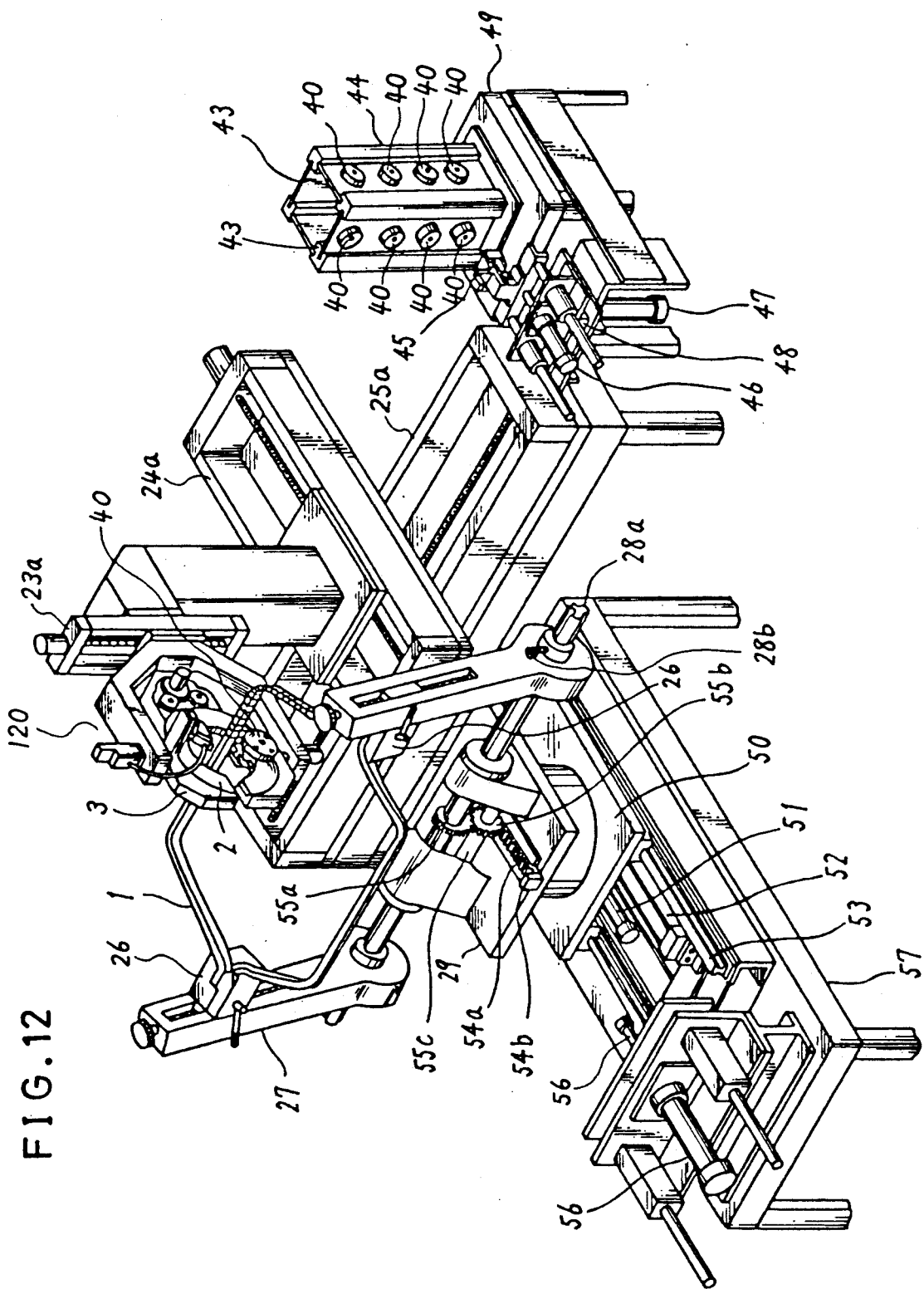
FIG. 12 is a perspective view showing another preferred embodiment of a taping apparatus in accordance with the present invention, further comprising an automatic tape interchanging mechanism.

Another preferred embodiment of the taping apparatus in accordance with the present invention is described referring to FIG. 12. The taping apparatus shown in FIG. 12 further comprises an automatic tape changing mechanism and an automatic coil wire turning mechanism in addition to the aforementioned taping apparatus shown in FIG. 1, in which the coil wire 1 clamped by the clamps 26 and 26 fixed on the arms 27 and 27 can be interchanged of its position and rotated by 180° around an axis of vertical center of the holder 29 so that the coil wire 1 can be taped on both sides automatically. In FIG. 12, four reels 40, ..., of the tape 4 shown in FIG. 11 are mounted on a tape holding cassette 43. The mounting mechanism for mounting the reel 40 of the tape 4 on the tape holding cassette 43 of FIG. 12 is substantially the same as that on the rotation member 2 shown in FIG. 11. From the tape holding cassette 43, a new reel 40 of the tape 4 is supplied to the rotation member 2, or on the contrary, an empty reel is restored thereto.

A cassette holder 44 contains four tape holding cassettes 43 in this embodiment and the tape holding cassette 43 is used by turning around its vertical axis by 90° after consumption of four reels at one vertical face thereof. A hand 45 (in FIG. 12) grasps the CAP 41 (in FIG. 11) when the the reel 40 of the tape 4 is to be changed. A horizontally moving cylinder 46 (in FIG. 12) holds the hand 45 and moves the hand 45 horizontally back and forth. A vertically moving cylinder 47 moves the hand 45 vertically up and down and stops at four positions respectively corresponding the positions of the four reels 40, 40, ... of the tape 4 mounted on the tape holding cassette 43. A rotary cylinder 48 turns the hand 45 by an angle of 90° from the position to receive a new reel 40 from the tape holding cassette 43 to the position to mount the reel 40 on the rotation member 2, and vice versa. The above-mentioned elements 43 to 48 are mounted on a base 49.

A rotary base 50 rotates by an angle of 180° for turning the coil wire 1, the arms 27 and 27 and so on which are mounted on the holder 29. A cylinder 51 is fixed on the rotary base 50 and rotates the rotary base 50 by the angle of 180°. In this embodiment, the linear movement of the cylinder 51 is converted to the rotation movement by using rack and pinion (not shown in the figure because of obviousness). A cylinder 52 moves the rotary base 50 horizontally forth and back and the movement of the rotary base 50 is guided by guide rails 53 and 53.

A rack 54a, which is an element of the turning mechanism of the arm 27 and 27 holding the coil wire 1, slides on the holder 29. An end block 54b fixed on an end of the rack 54a directly receives a driving force from the outside for sliding the rack 54a when the arms 27 and 27 are turned. A gear 55a is coupled with the spline shaft 28a and integrated fixed thereto by a key or the like (not shown in the figure). An intermediate grear 55b is positioned between the rack 54a and the gear 55a for converting and transmitting the linear movement of the rack 54a to a rotation of the gear 55a for turning the arms 27 and 27. The intermediate gear 55b is fixed on a shaft 55c which is born on the holder 29. A cylinder 56a is fixed on a holder 56b and supplies a driving force to the rack 54a when the rotary base 50 moves forth and the end block 54b touches the cylinder 56a. A table 57 holds the turning mechanism and coil turning mechanism.

Figure 13:
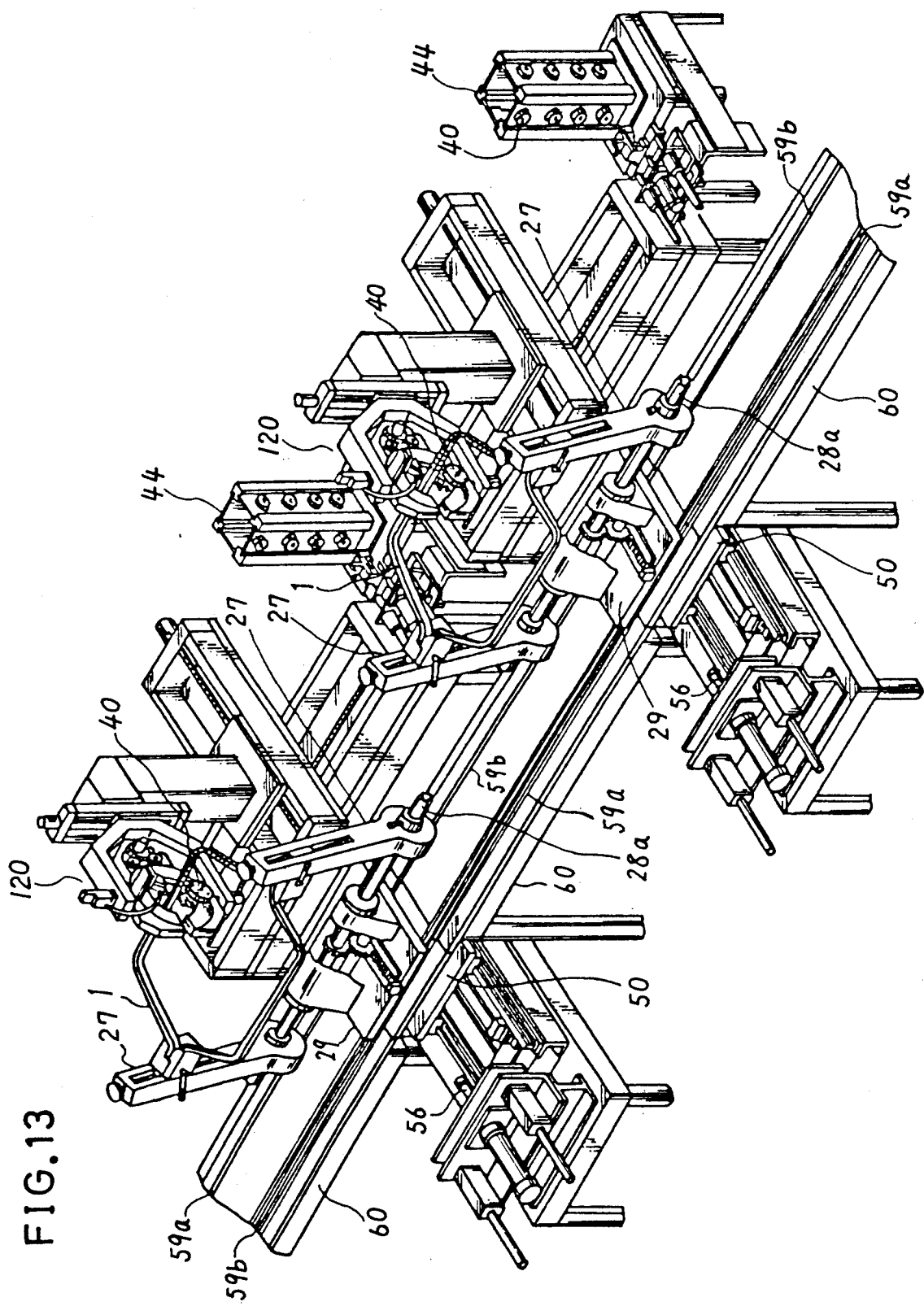
FIG. 13 is a perspective view showing still other perferred embodiment of a taping system comprising plurality of the taping apparatus in accordance with the present invention.
Figure 14:
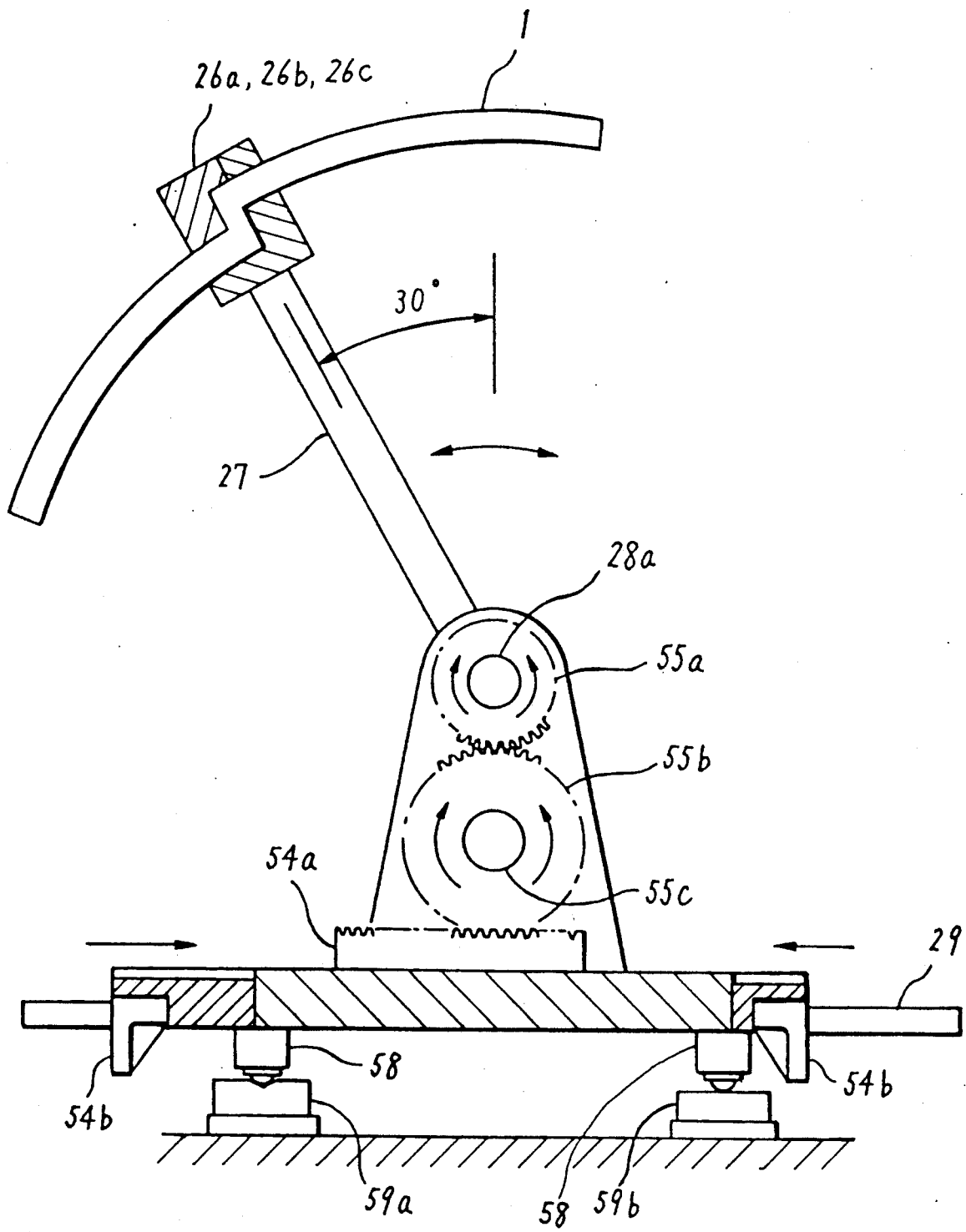
FIG. 14 is a cross-sectional view showing a clamp for clamping a coil wire and a tilt mechanism thereof in the taping apparatus in accordance with the present invention.

Still other preferred embodiment of the taping apparatus or system in accordance with the present invention is described referring to FIG. 13. In this embodiment, plurality of the taping apparatus as each having the same mechanisms of the above-mentioned automatic tape changing apparatus and the automatic coil turning apparatus are provided on a line. In the example of FIG. 13, two of the taping apparatuses are shown. And rails 59a and 59b are provided for carrying the holders 29 and 29 among the taping apparatuses. FIG. 14 is a cross-sectional view of the turning mechanism of the arms 27 and 27 in FIG. 12 accompanied with the rail part.

As shown in FIGS. 13 and 14, ball casters 58 and 58 are fixed on the bottom of the holder 29 for being moved among the taping apparatuses. The rails 59a and 59b guide the ball casters 58 and 58, and especially, the rail 59a has a V-letter shaped guide groove, thereby moving direction of the holder 29 is controlled. The rails 59a and 59b on each rotary base 50 as shown in the FIG. 13 are made separately from those of the adjacent parts on rail holders 60 and 60, so that the rotary base 50 can freely goes out. The rails 59a and 59b are held on the rail holders 60 and 60 between each of the taping apparatuses.

Next, operations of the tape changing, swing and turning of the coil are described.

When the tape 4 in the reel 40 of the tape 4 on the rotation member 2 is used up, the tape changing is to be executed. Data of numbers of the coil wires 1 which are able to be taped by one of the reel 40 of the tape 4 is previously inputted into the control apparatus (not shown in the figure), and the numbers of the coil wires 1 already taped is also counted and compared with the data by the control apparatus. When the counted numbers of the already taped coil wires 1 reaches the numbers of the data, the control apparatus judges that the tape 4 has been used up and starts the tape changing operation.

During the tape changing operation, the vertical sliding unit 23a, the back-and-forth sliding unit 24a, the right-and-left sliding unit 25a, the frame 3 and the rotation member 2 are respectively moved or rotated to a position where the tape changing is executed. At the same time, the hand 45 for grasping the reel 40 of the tape 4 is vertically moved to the highest position and turned by the angle 90° so as to face to the rotation member 2. When the movements of the sliding units 23a, 24a and 25a and the hand 45 are completed, the hand 45 moves forth by the cylinder 46 and grasps the reel 40 of the tape 4 on the rotation member 2. When the hand 45 is returned keeping the grasping of the reel 40 of the tape 4, the reel 40 of the tape 4 can be put out from the rotation member 2. After completely returning of the hand 45, it is rotated by the angle 90° to face to the tape holding cassette 43.

A position where the empty reel 40 is to be returned is memorized by a control apparatus. This position is the position wherefrom a new reel 40 full of the tape 4 was taken out, and it is one of the four positions of the reel on the tape holding cassette 43. The hand 45 is moved by the cylinder 47 to a position facing to the position whereto the tape is to be returned, and advanced by the cylinder 46. Thereby, the shaft 37 of the reel 40 of the tape 4 is inserted into a hole of the tape holding cassette 43, and the returning back operation of the reel 40 is completed.

Thereafter, a new reel 40 full of the tape 4 is supplied. A position where the new reel 40 of the tape 4 is to be taken out advances upwards. For example, the position is upper by one than the position whereto the empty reel 40 was returned. In case where the position whereto the empty reel 40 of the tape 4 was returned is the highest position, the cassette holder 44 is rotated by an angle of 90°, so as to face the hand 45 to a new tape holding cassette 43. And the hand 45 then takes out a new reel 40 of the tape 4 from the lowest position of the new tape holding cassette 43. The hand 45 is configurated to have a function of detecting whether the tape 4 is contained full or not (i.e. empty) in the reel 40 of the tape 4. (Such detection can be made by a proximity switch on the market and details is not described here.) If the tape 4 is not contained in the reel 40, the hand 45 searches one by one toward upper steps. When it found that the tape 4 is contained in the reel 40 of the tape 4, the hand 45 grasps the reel 40. As a result, the reel 40 full of tape 4 is taken out from the tape holding cassette 43.

Thereafter, the hand 45 rises to the highest position and rotated by the angle of 90° so as to face to the rotation member 2. Furthermore, the hand 45 advances to fit the shaft 37 of the reel 40 into the hole 2d of the rotation member 2 as shown in FIG. 11. Starting end of the tape 4 is clamped by the left and right clamp members 80 and 81 of the cutting and clamping mechanism 6 as shown in FIG. 3 and the hand 45 returns to the initial position. And, the new tape 4 is supplied.

Thus, the tape changing operation is completed. When all the tapes 4 contained in all the reel 40 of the tape 4 on one tape holding cassette 43 are run out, the tape holding cassette 43 with the empty reels is taken out from the cassette holder 44 manually during the automatic taping operation by the taping apparatus. And new reels 40 full of the tape 4 are mounted manually on the tape holding cassette 43.

The necessity of the turning of the arms 27 is described prior to the description of the turning operation of the coil wire 1.

The arms 27 and 27 are held inclined at a predetermined angle (which is, for example, 30° from the vertical plane in this embodiment as shown in FIG. 14.

Figure 16:
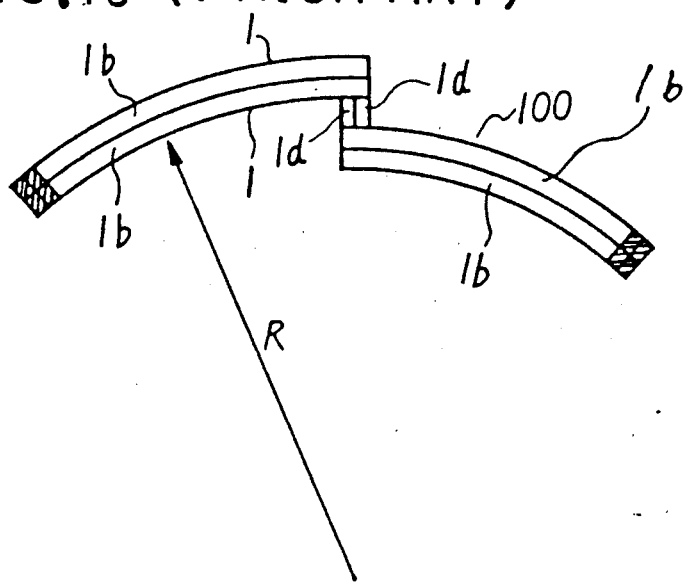
FIG. 16 is a XVI—XVI section view of FIG. 15.

As shown in FIG. 15 and 16, the finishing end parts 1b of the coil wire 1 are formed as arc shape of radius R. Accordingly, if the inclination angle of the arms 27 in FIG. 14 is zero, namely, the arm 27 stands vertically, the distance between the highest part and the lowest part of the coil wire 1 to be taped becomes very long. This means that it is generally impossible to tape the coil wire 1 without changing the position of the vertical sliding unit 23a. As the number of the axis to be controlled at the same time is increased, the control program for controlling the axis becomes complex. For simplifying the control program, the position of the vertical sliding unit 23a (of FIG. 1) is fixed and the height of the coil wire 1 is regarded as constant by inclining the arm 27 by angle 30° from the vertical line.

Timing of the swing and return operation is described. When the taping on one side of the coil wire 1 is completed, the rotation member 2 and the reel 40 of the tape 4 are positioned as shown in FIG. 10(c). At this time, the cylinder 56a is advanced forth and the rotary base 50 is brought back by the motion of the cylinder 52 shown in FIG. 12. As a result, the cylinder 56a contacts the end block 54b fixed on the rack 54a. When the rotary base 50 is further moves leftward thereby making contact of the cylinder 56a and the end block 54b (of FIG. 12), the rack 54a is pushed to start sliding. When the rack 54a starts to slide, the intermediate gear 55b, which is geared with the rack 54a, and the gear 55a, which is geared with the intermediate gear 55b, also start to rotate. And thereby, the arms 27 incorporated with the spline shaft 28a, which is coupled with the gear 55a starts the swing operation. When the rotary base 50 is completely brought leftward, the turning operation of the arms 27 and 27 is also completed.

After the turning operation of the arms 27 and 27 is completed, the cylinder 51 is advanced and the rotary base 50 is rotated by the angle of 180°, by the driving force of the cylinder 51 converted to the rotation force by the rack and pinion (not shown in the figure). As a result, the other slide branch of the coil wire 1 which is not yet taped comes close to the taping head part. Then, the rotary base 50 is moved to the taping head part 120 by the motion of the cylinder 52. And the taping operation which is afore-mentioned is repeated. When the taping on the both sides of the coil wire 1 is completed, the another turning operation of the coil wire 1 is executed and the coil wire 1 returns to the initial state shown in FIG. 12 or 13.

For taping several kinds of tapes on the same coil wire 1 or piling up the taping of the same kind of the tape on the coil wire 1 which is once taped, the plural taping apparatuses in accordance with the present invention are used by providing them on a line as shown in FIG. 13. In this case, the holders 29 and 29 are carried one by one by cylinders or the like.

Figure 17:
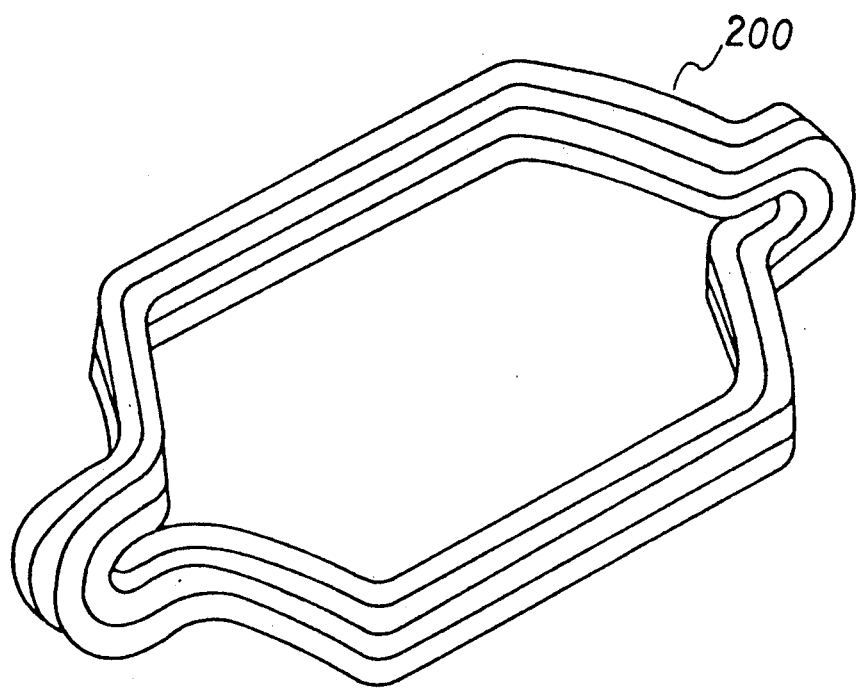
FIG. 17 is a perspective view showing another conventional coil.
Figure 18:
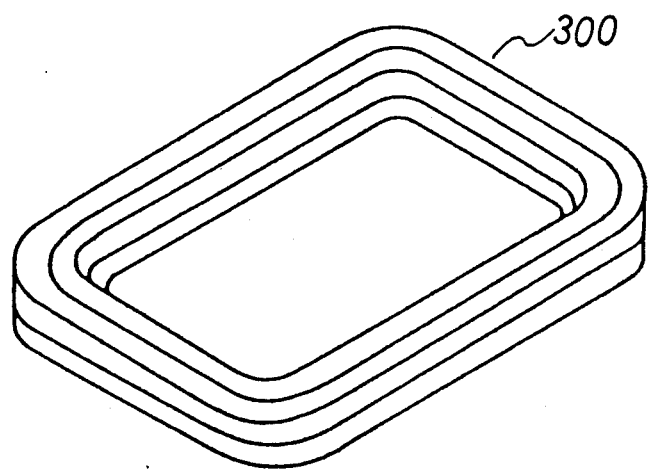
FIG. 18 is a perspective view showing still other conventional coil.
Figure 19:
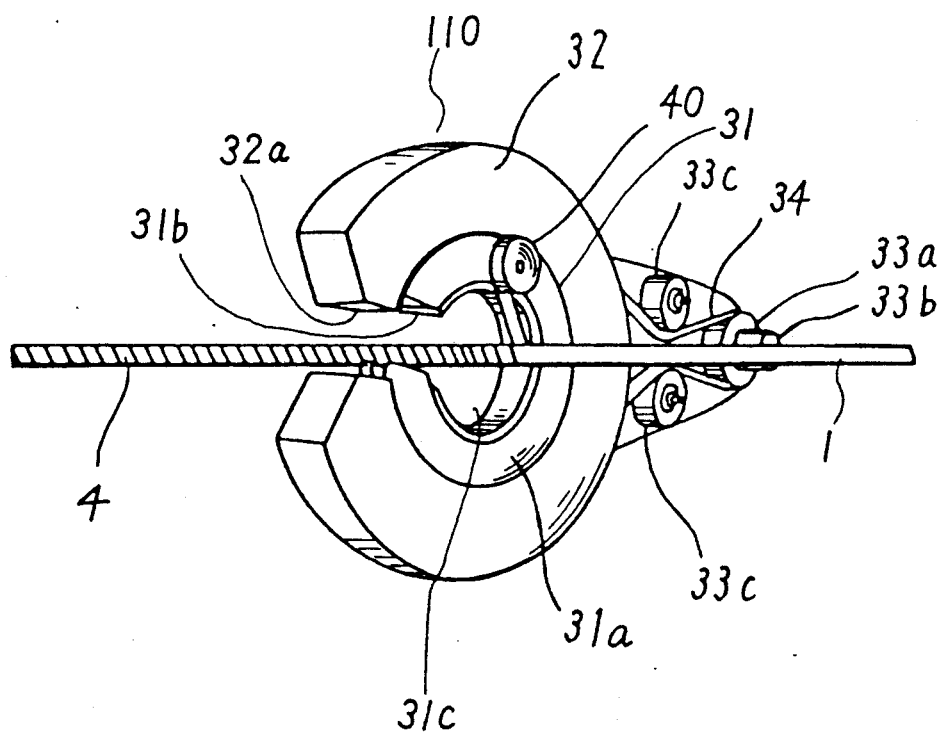
FIG. 19 is a perspective view showing a conventional taping head part of a taping apparatus.
Figure 20:
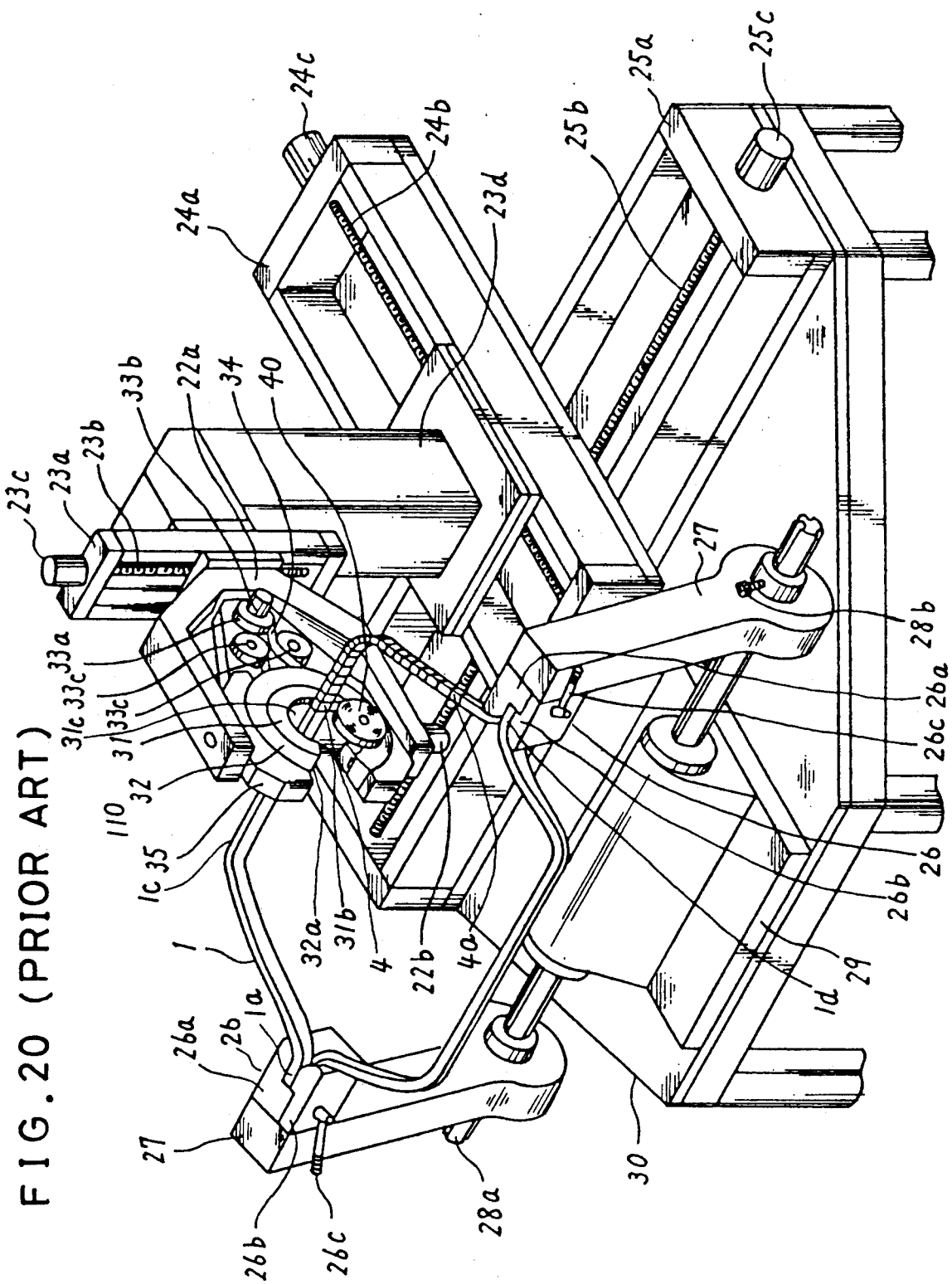
FIG. 20 is a perspective view showing a conventional taping apparatus.

In the aforementioned embodiments, the description was made on a hexagonal assembled coil 100 having the twisted part 1d and the lead part 1a shown in FIGS. 15 and 16. The taping apparatus in accordance with the present invention, however, is suitable for taping on another types of coils, for example, (1) a hexagonal or flat type coil 200 having double twisted parts shown in FIG. 17,
(2) a rectangular coil 300 shown in FIG. 18, or
(3) circular coil.

Furthermore, the taping apparatus in accordance with the present invention is applicable also for taping linear wire.

The shape of the clamps 26 and 26 need to be changed for applying it to the rectangular coil, circular coil or linear wire.

Furthermore, in the aforementioned embodiments, the vertical sliding unit 23a, the back-and-forth sliding unit 24a and the right-and-left sliding unit 25a are used for moving the rotation member 2 responding to the change of position to be taped. A Cartesian coordinated type robot on the market can be used for making.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A taping apparatus comprising:
   a frame;
   a rotation member defining a circular hole, a conductive member being disposed at the center of said circular hole, said rotation member being rotatably mounted within said frame;
   driving means mounted on said frame for rotatingly driving said rotation member;
   tape holding means provided on said rotation member for holding a reel of a tape with its axis parallel to the axis of rotation of said rotation member and with a predetermined distance from said axis of rotation;
   moving means for relatively moving at least one of said rotation member and said conductive member;
   tape clamp means provided on said frame for clamping a starting end and a finishing end of said tape at the start and at the finish of a taping operation in which said tape is wound around said conductive member;
   adhesion means provided on said frame for supplying an adhesive on said conductive member for adhering the starting end of said tape on said conductive member at the start of said taping operation and the finishing end of said tape on said conductive member at the finish of said taping operation; and
   cutting means provided on said frame for cutting the ends of said tape.

2. A taping apparatus comprising:
   a frame;
   a rotation member defining a circular hole, a conductive member being disposed at the center of said circular hole, said rotation member being rotatably mounted within said frame;
   driving means mounted on said frame for rotatingly driving said rotation member;
   tape holding means provided on said rotation member for holding a reel of a tape with its axis parallel to the axis of rotation of said rotation member and with a predetermined distance from said axis of rotation;
   moving means for relatively moving at least one of said rotation member and said conductive member;
   tape clamp means provided on said frame for clamping a starting end and a finishing end of said tape at the start and at the finish of a taping operation in which said tape is wound around said conductive member;
   adhesion means provided on said frame for supplying an adhesive on said conductive member for adhering the starting end of said tape on said conductive member at the start of said taping operation and the finishing end of said tape on said conductive member at the finish of said taping operation;
   cutting means provided on said frame for cutting the ends of said tape;
   a reserve tape holder for holding plural tape windings which is to be changed for installation on said tape holding means when a tape thereon runs out; and
   a tape transfer device for transferring said reserve tape reel from said reserve tape holder to said tape holding means.

3. A taping apparatus comprising:
   a frame;
   a rotation member defining a circular hole, a conductive member being disposed at the center of said circular hole, said rotation member being rotatably mounted within said frame;
   driving means mounted on said frame for rotatingly driving said rotation member;
   tape holding means provided on said rotation member for holding a reel of a tape with its axis parallel to the axis of rotation of said rotation member and with a predetermined distance from said axis of rotation;
   moving means for relatively moving at least one of said rotation member and said conductive member;
   tape clamp means provided on said frame for clamping a starting end and a finishing end of said tape at the start and at the finish of a taping operation in which said tape is wound around said conductive memeber;
   adhesion means provided on said frame for supplying an adhesive on said conductive member for adhering the starting end of said tape on said conductive member at the start of said taping operation and the finishing end of said tape on said conductive member at the finish of said taping operation;
   cutting means provided on said frame for cutting the ends of said tape;
   a first holding member which is movable toward said frame and away from said frame;
   a second holding member being rotatably mounted on said first holding member;
   clamping means for clamping said conductive member from both sides of said rotation member; and
   inclining means provided on said second holding member for inclining said clamping means around a horizontal shaft.

4. A taping system for taping plural kinds of tapes on the same conductive member comprising:
   (a) a plurality of taping apparatuses having:
      a frame;
      a rotation member having a circular hole, a conductive member being disposed at the center of said circular hole, said rotation member being rotatably mounted within said frame;
      driving means mounted on said frame for rotatingly driving said rotation member;

tape holding means provided on said rotation member for holding a reel of a tape with its axis parallel to the axis of rotation of said rotation member and with a predetermined distance from said axis of rotation;

moving means for relatively moving at least one of said rotation member and said conductive member;

tape clamp means provided on said rotation member for clamping a starting end and a finishing end of said tape at the start and at the finish of a taping operation in which said tape is wound around said conductive member;

adhesion means provided on said frame for supplying an ashesive on said conductive member for adhering the starting end of said tape on said conductive member at the start of said taping operation and the finishing end of said tape on said conductive member at the finish of said taping operation; and cutting means provided on said frame for cutting the ends of said tape;

(b) a plurality of clamping means for clamping said conductive member; and (c) a conductive member carrying means provided between each of said taping apparatuses for carrying said conductive member clamped on said clamping means among said plurality of taping apparatuses.

* * * * *